H. P. RICHARDS.
CHAIN DRILL.
APPLICATION FILED AUG. 10, 1918.
1,294,168.
Patented Feb. 11, 1919.
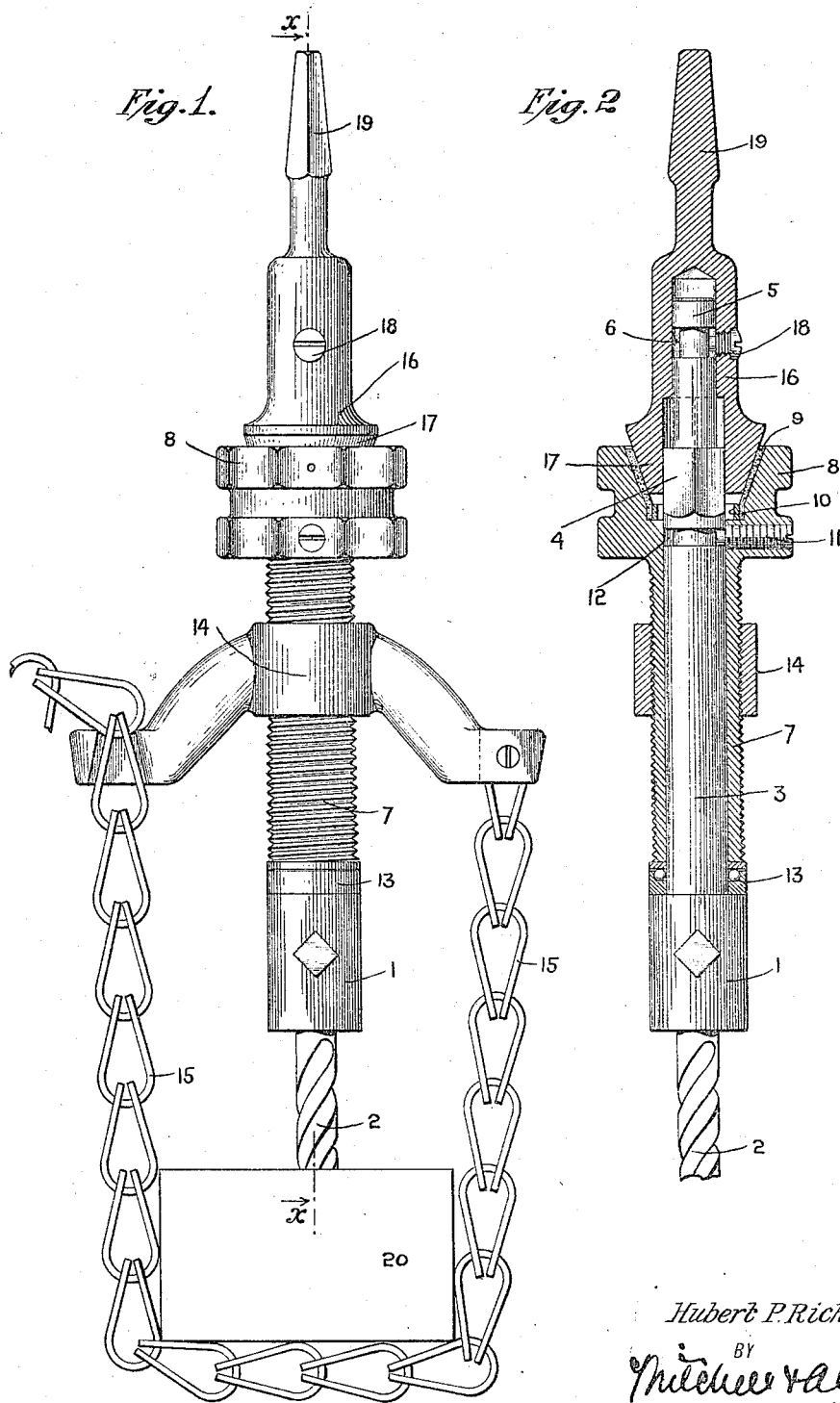
INVENTOR,
Hubert P. Richards
BY
ATTORNEYS.

UNITED STATES PATENT OFFICE.

HUBERT P. RICHARDS, OF NEW BRITAIN, CONNECTICUT, ASSIGNOR TO THE STANLEY RULE & LEVEL CO., OF NEW BRITAIN, CONNECTICUT, A CORPORATION OF CONNECTICUT.

CHAIN-DRILL.

1,294,168.      Specification of Letters Patent.      Patented Feb. 11, 1919.

Application filed August 10, 1918. Serial No. 249,259.

*To all whom it may concern:*

Be it known that I, HUBERT P. RICHARDS, a citizen of the United States of America, residing at New Britain, Connecticut, have invented a new and useful Chain-Drill, of which the following is a specification.

My invention relates to improvements in drills and is especially useful in connection with that type of a tool known as a chain drill, in which the drill is held against the work by means of a chain. It is my object to improve the structural features, notably with regard to the means for feeding the drill as the work proceeds, the construction being such that the feeding mechanism is universally adapted to drills of all different sizes and may be regulated simply by varying the endwise pressure against the driving means by which the drill proper is turned.

The structure is also such that the feeding may be independently done by hand. The above and other advantages will be apparent to the mechanic skilled in the art from a reading of the following description and a study of the accompanying drawings, in which I have shown my invention in its preferred form, being conscious of the fact that various changes and modification may be made therein without departing from the spirit or scope of the invention.

In the drawings:

Figure 1 is a side elevation of the drill reduced in size and as it would appear in use.

Fig. 2 is a section on the line x—x, Fig. 1, of the main parts of the tool shown therein, certain portions being removed.

1 represents the tool holding device or chuck in which the drill 2 is suitably held in its operative position, any appropriate means being provided to grip the drill therein. 3 represents a spindle connected with the holder 1. Near the upper part of the spindle 3 is a squared or angular portion 4, and beyond this angular portion 4 the spindle is reduced in diameter and made round in cross section, as at 5. This round portion 5 is provided with an annular groove 6 for the purpose hereinafter described. 7 is a sleeve which surrounds the main portion of the spindle 3 between the squared portion 4 and the holder 1. 8 is an enlargement at the outer end of the sleeve 7, the outer end of which enlargement is provided with a tapered mouth in which I preferably locate a correspondingly tapered washer or bushing 9 of some suitable material well adapted to withstand wear and which will at the same time afford a good friction surface. This washer, if made of leather for example, may be locked in place by means of a ring 10 which may be driven into the bottom of the mouth, the surrounding wall thereof adjacent the ring being cut back parallel to the axis of the spindle 3 so that the ring 10 may properly grip the washer 9, as shown in Fig. 2, or said washer may be held in any suitable way. 11 is a screw pin carried by the enlargement 8, the inner end of the same projecting into an annular groove 12 in the spindle 3 just below the squared portion 4, the purpose of the screw pin being to properly position the sleeve 7 on the spindle 3 and to hold it against undue longitudinal movement relatively thereto. Between the end of the sleeve 7 and the shoulder formed by the holder 1, I preferably locate a suitable anti-friction thrust bearing 13, the particular bearing shown being of the ball type. The outer wall of the sleeve 7 is screw threaded and mounted thereon is a cross head 14. To one end of the cross head I attach a suitable cable or chain 15. When the tool is to be placed against the work as shown in Fig. 1, the free end of the chain is passed around the work and is connected with the opposite end of the cross head in such a manner as to hold the work as snugly as possible against the point of the drill. If the pressure of the drill point when the parts are thus assembled against the work is not sufficient, the operator may simply grasp the enlargement 8 and turn it in a direction to cause the screw to feed down through the cross head, thus forcing the point of the drill against the work with the desired additional firmness. 16 is what I may term the driver. In this instance, the driver has a central bore which overstands the end 5 of the spindle, while the lower end of the driver is provided with a cone 17 adapted to fit into the tapered mouth at the outer end of the enlargement 8, the taper of the cone corresponding to the taper of the mouth. The bore of the driver is also shaped to make a sliding fit on the squared portion 4 of the spindle 3. 18 is a screw pin which is carried by the side wall of the driver 16, the inner end of the pin projecting into the aforesaid annular groove 6 in the end 5 of the spindle. This groove 6 is of such length or dimensions that the driver is permitted to have a limited sliding movement on the outer end of the spindle so that the cone 17 may make a tight or loose fit with the surrounding wall of the tapered mouth in the outer end of the enlargement 8, whereby there may be different degrees of frictional engagement effected between the driver 16 and the sleeve 7.

The outer end of the driver 16 may be provided with any suitable means whereby the same may be turned. In this particular instance the outer end 19 of the driver is suitably shaped to receive the chuck of an ordinary bit stock, such a device being too well known to require illustration and therefore being omitted from the drawings.

*Operation.*

Assuming the parts are set up as indicated in Fig. 1. It is perfectly clear that when the driver 16 is turned, it is bound to turn the tool holder 1 through the medium of the squared spindle connection 4. If no substantial endwise pressure is applied to the driver 16, the only effect of turning the driver 16 will be to turn the drill. If, however, substantial endwise pressure is applied to the driver 16, it will cause the cone 17 to frictionally engage the enlargement 8 of the sleeve 7 so as to rotate the latter in the cross head 14, the effect of which will be to feed the drill forwardly into the block in which the hole is being cut, said block being conventionally illustrated at 20. As soon as the drill bites into the material sufficiently, the operator lets up on the endwise pressure to a sufficient extent to permit the cone 17 to rotate within the surrounding wall of the sleeve enlargement 8 whereby the latter will cease rotating while the drill will continue to rotate as the driver is revolved, until it becomes necessary to again advance the drill whereupon the above operation may be repeated until the point of the drill has been fed through or into the block as far as desired. Among the many advantages derived by my improved construction, is the advantage that when the drill starts to break through the block, there need be no feeding pressure that will cause the drill to penetrate so rapidly that the drill lips will catch and break. On the contrary, the completion of the drilling operation may be conducted under light pressure so that this danger will be avoided. It is apparent that it is always within the power of the operator to perfectly control with the utmost delicacy the feeding pressure, and this, irrespective of the size of the drill. It is thus within his power to cause the drill to feed either slowly or rapidly according to the character of the work to be done and the material operated upon.

The feeding forwardly of the drill may be intermittent as above indicated, or it may be gradual. In the latter instance the operator simply governs the endwise pressure against the driver so that the cone clutch will drive the said screw sleeve ahead at the proper speed which may be either the maximum speed of the screw sleeve when clutched tightly to the driver, or a reduced speed as would occur in the event a slight slippage were permitted between the driver cone and its seat in the enlargement. For convenience of expression, I may refer to the cross head 14 or any equivalent device as the anchorage means, because it is by this means and its associate chain or equivalent means that the drill is anchored in operative position; I may also refer to the sleeve 7 or any equivalent means as the feeding sleeve or feeding means. I may also refer to the spindle 3 which carries the tool, as the tool spindle.

I claim:

1. In a tool of the character described, a tool spindle, a driver mounted thereon to turn therewith but having some to and fro movement relatively thereto, anchorage means associated with said driving spindle, feeding means for moving said driving spindle relatively to said anchorage, a cone clutch connection between said driver and feeding means whereby the movement of the former may be transmitted to the latter by the application of endwise pressure on the driver.

2. In a tool of the character described, a tool spindle, a driver mounted thereon to turn therewith but having some to and fro movement relatively thereto, anchorage means associated with said driving spindle, feeding means for moving said driving spindle relatively to said anchorage, a cone clutch connection between said driver and feeding means whereby the movement of the former may be transmitted to the latter by the application of endwise pressure on the driver, said feeding means comprising a sleeve interposed between said anchorage and said tool spindle, said sleeve being located in position to take the endwise thrust of said spindle.

3. In a tool of the character described, a tool spindle, a driver mounted thereon to turn therewith but having some to and fro movement relatively thereto, anchorage means associated with said driving spindle, feeding means for moving said driving spindle relatively to said anchorage, a cone clutch connection between said driver and feeding means whereby the movement of the former may be transmitted to the latter by the application of endwise pressure on the driver, said feeding means comprising a sleeve interposed between said anchorage and said tool spindle, said sleeve being located in position to take the endwise thrust of said spindle, and a threaded connection between said anchorage and said sleeve.

4. In a tool of the character described, a tool spindle, a feeding sleeve surrounding the same and arranged to take the endwise working thrust of said spindle, a cross head threaded on the outside of said sleeve, a driver on the outer end of said tool spindle mounted to slide but not to rotate thereon, a cone clutch between said driver and said feeding sleeve whereby endwise pressure on the driver while the latter is being rotated will impart rotative movement to both the tool spindle and the feeding sleeve simultaneously and whereby when endwise pressure is released rotative movement will be imparted to the tool spindle alone.

5. In a tool of the character described, a tool spindle, a feeding sleeve surrounding the same and arranged to take the endwise working thrust thereof, a cross head threaded on the outer side of said sleeve, a driver mounted on the outer end of said tool spindle to slide but not to rotate thereon, a friction coupling device between said driver and said feeding sleeve for transmitting the rotary motion of the former to the latter, the degree of frictional engagement between said parts being variable and controllable by the degree of endwise pressure against said driver.

6. In a tool of the character described, a tool spindle, a feeding sleeve surrounding the same and arranged to take the endwise working thrust thereof, a cross head threaded on the outer side of said sleeve, a driver mounted on the outer end of said tool spindle to slide but not to rotate thereon, a friction coupling device between said driver and said feeding sleeve for transmitting the rotary motion of the former to the latter, the degree of frictional engagement between said parts being variable and controllable by the degree of endwise pressure against said driver, said driver being rotatable independently of said feeding device when said endwise pressure is released.

7. In a tool of the character described, a tool spindle, a rotatable driver associated therewith to rotate said spindle, a feeding device coöperating with said spindle, a friction clutching means between said driver and feeding device constructed to permit of varying degrees of frictional engagement depending upon the degree of endwise pressure on said driver, whereby the feeding speed may be varied at will during the drilling operation incidental to the rotation of the driver and the spindle and means for holding said tool in the working position relative to the material to be drilled.

HUBERT P. RICHARDS.

Copies of this patent may be obtained for five cents each, by addressing the "Commissioner of Patents, Washington, D. C."